US011951638B2

(12) United States Patent
Hsieh et al.

(10) Patent No.: US 11,951,638 B2
(45) Date of Patent: Apr. 9, 2024

(54) COMPUTER DEVICE AND METHOD FOR DETERMINING STANDARD DEPTH VALUE OF MARKER

(71) Applicant: Chiun Mai Communication Systems, Inc., New Taipei (TW)

(72) Inventors: Tung-Chun Hsieh, New Taipei (TW); Chung-Wei Wu, New Taipei (TW); Chih-Wei Li, New Taipei (TW); Chia-Yi Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 664 days.

(21) Appl. No.: 17/136,949

(22) Filed: Dec. 29, 2020

(65) Prior Publication Data

US 2021/0197390 A1 Jul. 1, 2021

(30) Foreign Application Priority Data

Dec. 31, 2019 (CN) .......................... 201911416699.9

(51) Int. Cl.
*B25J 13/08* (2006.01)
*B25J 9/16* (2006.01)
(Continued)

(52) U.S. Cl.
CPC ........... *B25J 9/1697* (2013.01); *G06T 1/0014* (2013.01); *G06T 7/55* (2017.01); *G06T 7/74* (2017.01);
(Continued)

(58) Field of Classification Search
CPC ...... B25J 9/1697; B25J 13/085; B25J 9/1602; B25J 9/00; B25J 9/16; B25J 9/0096;
(Continued)

(56) References Cited

U.S. PATENT DOCUMENTS

| 2005/0151963 A1* | 7/2005 | Pulla | G01B 9/02031 |
| | | | 33/503 |
| 2012/0004774 A1* | 1/2012 | Umetsu | B25J 9/1697 |
| | | | 700/254 |

(Continued)

FOREIGN PATENT DOCUMENTS

| CN | 106272424 A | 1/2017 |
| CN | 106826815 A | 6/2017 |

(Continued)

OTHER PUBLICATIONS

Herrera et al., "Joint Depth and Color Camera Calibration with Distortion Correction," Oct. 2012 (Year: 2012).*

*Primary Examiner* — Adam R Mott
*Assistant Examiner* — Byron Xavier Kasper
(74) *Attorney, Agent, or Firm* — ScienBiziP, P.C.

(57) ABSTRACT

A method for determining a standard depth value of a marker includes obtaining a maximum depth value of the marker. A reference depth value of the marker is obtained based on a depth image of the marker, and a Z-axis coordinate value of the marker is obtained based on a color image of the marker. When the reference depth value and the Z-axis coordinate value are both less than the maximum depth value, and a difference between the reference depth value and the Z-axis coordinate value is not greater than 0, the depth reference value is set as the standard depth value of the marker; and when the difference is greater than 0, the Z-axis coordinate value is set as the standard depth value of the marker.

18 Claims, 4 Drawing Sheets

(51) Int. Cl.
*G06T 1/00* (2006.01)
*G06T 7/55* (2017.01)
*G06T 7/73* (2017.01)

(52) U.S. Cl.
CPC .............. *G06T 2207/10024* (2013.01); *G06T 2207/10028* (2013.01); *G06T 2207/30204* (2013.01)

(58) Field of Classification Search
CPC ........ B25J 9/161; B25J 9/1633; B25J 9/1661; B25J 9/1669; B25J 9/1679; B25J 9/1692; B25J 9/1684; B25J 9/1694; B25J 13/082; B25J 13/084; B25J 19/021; B25J 19/023; G06T 1/0014; G06T 7/55; G06T 7/74; G06T 2207/10024; G06T 2207/10028; G06T 2207/30204
See application file for complete search history.

(56) References Cited

U.S. PATENT DOCUMENTS

| | | | |
|---|---|---|---|
| 2015/0150457 A1* | 6/2015 | Wu | A61B 5/445 600/425 |
| 2016/0349925 A1* | 12/2016 | Kamamori | G06F 3/04883 |
| 2019/0188513 A1* | 6/2019 | Beghtol | G07G 1/0045 |
| 2020/0345291 A1* | 11/2020 | Bradley | A61B 1/05 |

FOREIGN PATENT DOCUMENTS

| | | |
|---|---|---|
| CN | 107650149 | 2/2018 |
| CN | 109767416 A | 5/2019 |
| CN | 209850931 | 12/2019 |

* cited by examiner

COMPUTER DEVICE AND METHOD FOR DETERMINING STANDARD DEPTH VALUE OF MARKER

FIELD

The present disclosure relates to robot control technology, in particular to a computer device and a method for determining a standard depth value of a marker.

BACKGROUND

Factories use robotic arms for automated production. Robotic arms usually find a gripping position of a target object based on a marker attached to the target object. Therefore, an accuracy of a depth value of the marker directly affects whether the robotic arm can successfully grasp the target object.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
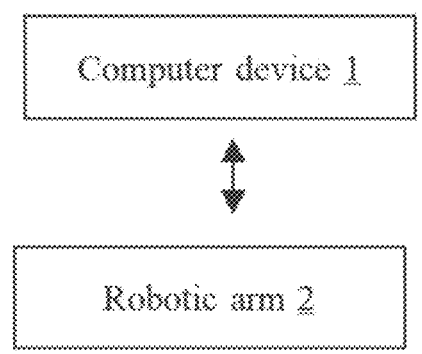
FIG. 1 illustrates an environment in which a method for determining a standard depth value of a marker is applied.

Referring to FIG. 1, in this embodiment, a method for determining a standard depth value of a marker can be applied to an application environment including a computer device 1 and a robotic arm 2.

In this embodiment, the computer device 1 can establish a wireless communication connection with the robotic arm 2. For example, the computer device 1 may establish a communication connection with the robotic arm 2 through a wireless router (not shown in the figure).

Figure 2:
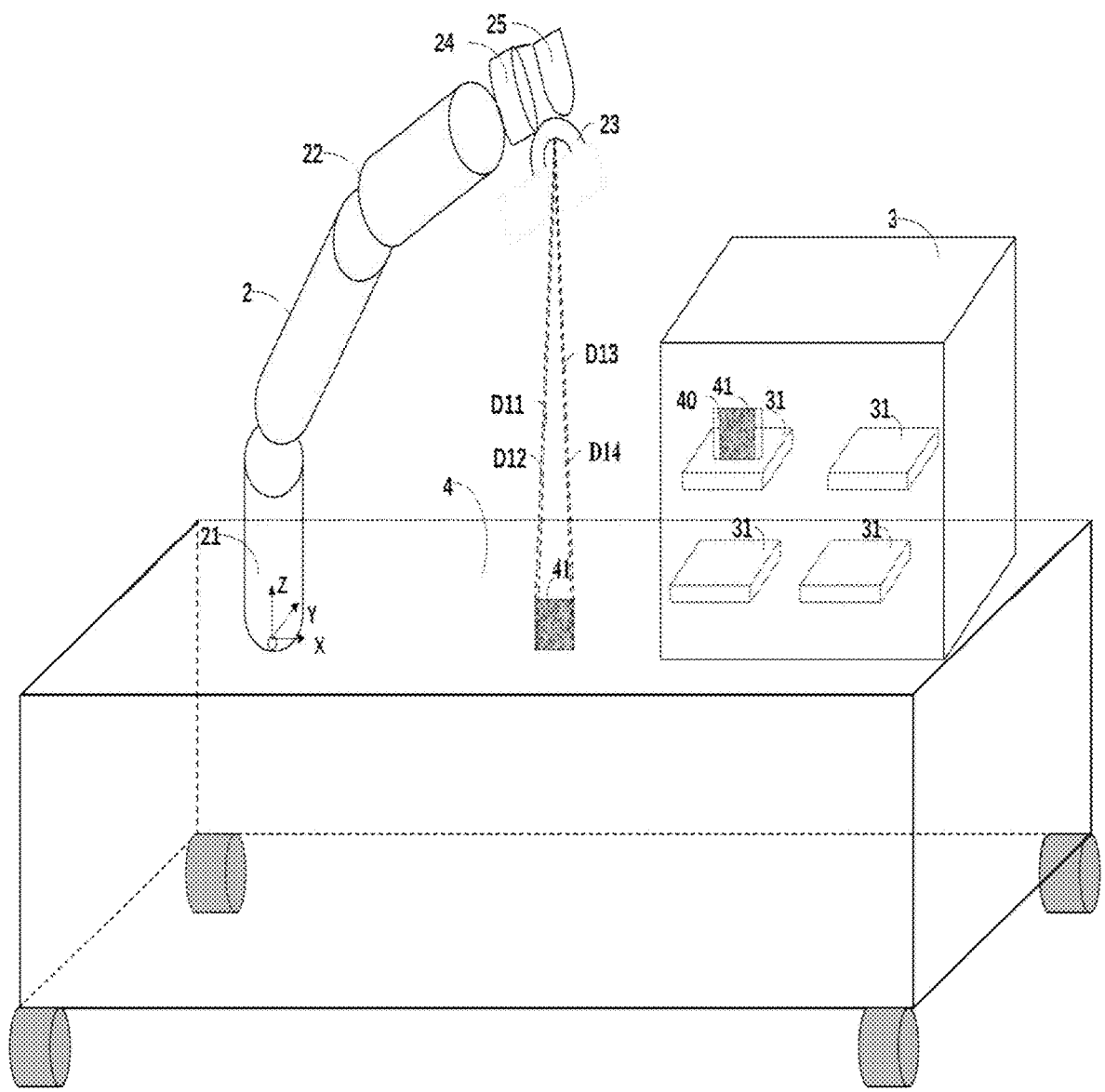
FIG. 2 illustrates a robotic arm and an external jig including internal jigs.

Referring to FIG. 2, in this embodiment, the robotic arm 2 is placed on a carrying platform 4. The carrying platform 4 can be a movable platform. In this embodiment, the carrying platform 4 also carries a jig 3 (to clearly describe the present disclosure, hereinafter the jig 3 is referred to as "external jig 3"). Multiple jigs 31 (to clearly describe the present disclosure, hereinafter the jig 31 is referred to as "internal jig 31") may be included in the external jig 3

In this embodiment, the robotic arm 2 includes a base 21, an arm 22, a gripper 23, a force sensor (i.e., a force-torque sensor) 24, and a camera 25. The arm 22 is connected to the base 21, and the force sensor 24 is disposed between the arm 22 and the camera 25. The gripper 23 is set at a front end of the arm 22. The camera 25 may be a depth camera.

Referring to FIG. 2, in this embodiment, a bottom end of the base 21 of the robotic arm 2 can be set as an origin O of a three-dimensional coordinate system of the robotic arm 2, a horizontal plane wherein the bottom end of the base 21 is located is set as a XOY plane of the three-dimensional coordinate system, and a direction perpendicular to the XOY plane is set as a Z-axis of the three-dimensional coordinate system.

In this embodiment, the computer device 1 can control the robotic arm 2 to grasp a target object 40 placed on the internal jig 31 and place the target object 40 on the carrying platform 4.

In this embodiment, the target object 40 can be any product such as a motherboard or another product.

In this embodiment, a marker 41 is set on the target object 40. The marker 41 may be ArUco Markers.

It should be noted that the ArUco marker is a binary square marker, which consists of a wide black border and an internal binary matrix. The internal matrix determines the ID. The black border is conducive to fast detection of the image, the binary code can verify the ID, and allows the application of error detection and correction technology. A size of the ArUco markers determines a size of the internal binary matrix. For example, a 4*4 ArUco marker consists of 16 bits.

In this embodiment, the size of the marker 41 may be 4 cm*4 cm. Of course, in other embodiments, the size of the marker 41 can also be other sizes. In this embodiment, the robotic arm 2 can find a gripper position of the target object 40 based on the marker 41. Therefore, an accuracy of a depth value of the marker 41 directly affects whether the robotic arm 2 can successfully grasp the target object 40.

In this embodiment, the marker 41 is further set on the carrying platform 4, and four sides of the marker 41 are parallel to the carrying platform 4. How to determine the depth value of the marker 41 will be described below in conjunction with FIG. 3. In order to explain the present disclosure clearly and simply, hereinafter the depth value of the marker 41 is referred to as "standard depth value".

In this embodiment, the method for determining the standard depth value of the marker 41 can be applied to a computer device e.g., the computer device 1. For the computer device that needs to determine the standard depth value of the marker 41, the present disclosure can be directly integrated on the computer device. The function provided by the method for determining the standard depth value of the marker 41 may be run on the computer device in the form of a software development kit (SDK).

Figure 3:
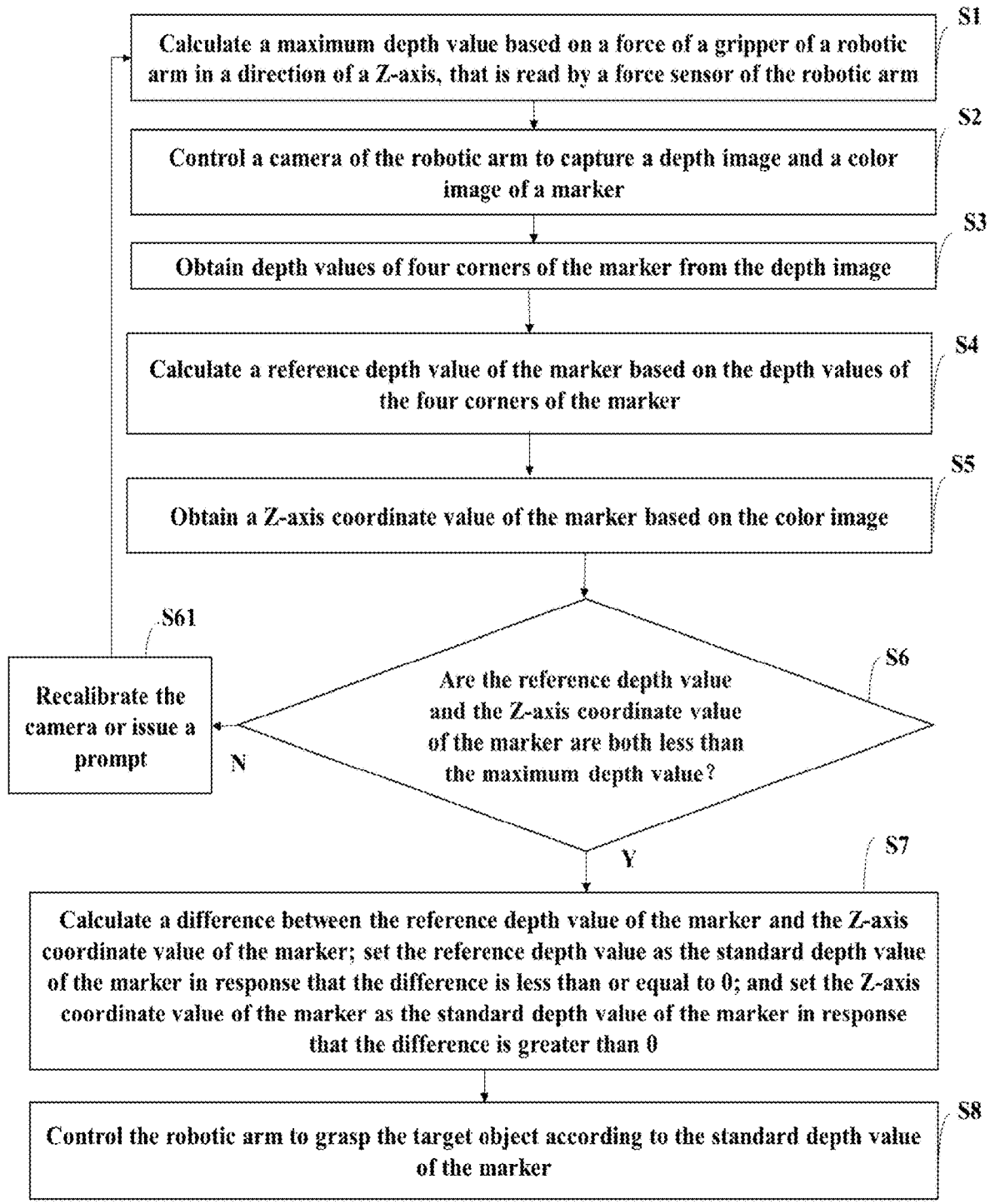
FIG. 3 is a flowchart of a method for determining a standard depth value of a marker provided by a preferred embodiment of the present disclosure.

As shown in FIG. 3, the method for determining the standard depth value of the marker includes the following blocks. According to different requirements, the order of the blocks in the flowchart can be changed, and some blocks can be omitted.

At block S1, the computer device 1 calculates a maximum depth value Zmax based on a force of the gripper 23 in a direction of the Z-axis (i.e., the Z-axis direction) that is read by the force sensor 24 of the robotic arm 2. The computer device 1 establishes a coordinate system O-XYZ by setting a horizontal plane where the carrying platform 4 carrying the robotic arm 2 is located as an XOY plane of the coordinate system O-XYZ, and setting a direction perpendicular to the XOY plane as a Z axis of the coordinate system O-XYZ.

Specifically, referring to FIG. 2, in this embodiment, the computer device 1 sets a bottom end of the base 21 of the robotic arm 2 as the origin O, and sets the horizontal plane where the bottom end of the base 21 is located as the XOY plane, and sets a upward direction vertical to the XOY plane as the Z-axis.

In one embodiment, the calculating the maximum depth value Zmax based on the force of the gripper 23 in the direction of the Z-axis read by the force sensor 24 of the robotic arm 2 includes (a1)-(a6):

(a1) Setting the gripper 23 of the robotic arm 2 at a preset distance from the carrying platform 4.

In this embodiment, the preset distance may be 30 cm or 35 cm. The preset distance can be set according to actual application scenarios.

(a2) Controlling the robotic arm 2 to drive the gripper 23 to move down at a constant speed, and reading the force of the gripper 23 in the direction of Z-axis using the force sensor 24 of the robotic arm 2.

Specifically, the computer device can control the robotic arm 2 to drive the gripper 23 to move vertically downward at the constant speed.

(a3) Determining whether a change of the force in the gripper 23 in the direction of Z-axis is greater than a preset value (for example, 1 Newton, 1.5 Newton, or other values) according to the force of the gripper 23 in the direction of Z-axis read by the force sensor 24. When the change in the force of the gripper 23 in the direction of Z-axis is greater than the preset value, the process goes to block (a4). When the force change of the gripper 23 in the direction of Z-axis is less than or equal to the preset value, the block (a3) is repeated.

In one embodiment, the change in the force of the gripper 23 in the direction of Z-axis may refer to a difference between a first force value and a second force value. The first force value refers to the force of the gripper 23 in the Z-axis direction when the robotic arm 2 drives the gripper 23 to move down at the constant speed. The second force value refers to the force of the gripper 23 in the Z-axis direction when the robotic arm 2 does not drive the gripper 23 to move down at a constant speed. In other words, the second force value refers to the force value read by the force sensor 24 before the robotic arm 2 drives the gripper 23 to move down.

(a4) When the change in the force of the gripper 23 in the Z-axis direction is greater than the preset value, obtaining a Z-axis coordinate value of the robotic arm 2 and count a total number of Z-axis coordinate values of the robotic arm 2 which have been obtained. In other words, the total number of Z-axis coordinate values of the robotic arm 2 which have been obtained is increased by 1, when the change in the force of the gripper 23 in the Z-axis direction is greater than the preset value.

(a5) Determining whether the total number of Z-axis coordinate values of the robotic arm 2 which have been obtained equals N. If the total number of Z-axis coordinate values of the robotic arm 2 which have been obtained equals N, the process goes to block (a6). If the total number of Z-axis coordinate values of the robotic arm 2 which have been obtained is less than N, the process goes to block (a1).

In this embodiment, N may be equal to 30, or other value, such as 40 or 50.

(a6) When the total number of Z axis coordinate values of the robotic arm 2 that have been obtained equals N, calculating the maximum depth value Zmax based on the N number of Z-axis coordinate values of the robotic arm 2 that have been obtained according to the RMS (Root Mean Square).

The RMS is also called as the quadratic mean, which is an expression of a generalized mean of a power of 2 and can also be called as the mean of the second power. Specifically, the maximum depth value Zmax is calculated using the following formula:

$$Z\max = \sqrt{\frac{\sum_{i=1}^{n} x_i^2}{n}}$$

Wherein, n represents the total number of Z-axis coordinate values of the robotic arm 2 that have been obtained (that is, n=N, for example, n=30), $x_i$ represents the Z-axis coordinate value of the robotic arm 2.

At block S2, the computer device 1 controls the camera 25 of the robotic arm 2 to capture the marker 41 on the carrying platform 4 and obtains a depth image and a color image containing the marker 41 on the carrying platform 4.

As shown in FIG. 2, the four sides of the marker 41 on the carrying platform 4 are parallel to the carrying platform 4.

It should be noted that the markers 41 mentioned in the following blocks all refer to the markers 41 on the carrying platform 4, the markers 41 mentioned in the following blocks do not refer to the markers 41 on the target object 40 on the internal jig 31.

At block S3, the computer device 1 obtains depth values of four corners of the marker 41 from the depth image.

For example, referring to FIG. 2, the computer device 1 obtains depth values D11, D12, D13, and D14 of the four corners of the marker 41.

At block S4, the computer device 1 calculates a reference depth value Zrms of the marker 41 based on the depth values of the four corners of the marker 41.

In this embodiment, the computer device 1 calculates the reference depth value Zrms of the marker 41 based on the depth values of the four corners of the marker 41 according to the root mean square.

Specifically, the formula for calculating the reference depth value Zrms is:

$$Z\mathrm{rms} = \sqrt{\frac{\sum_{i=1}^{n} x_i^2}{n}}$$

Wherein, n represents a number of corners of the marker 41 (that is, n=4 in this embodiment), and $x_i$ represents the depth value of each corner of the marker 41.

At block S5, the computer device 1 obtains a Z-axis coordinate value Zcv of the marker 41 based on the color image.

Specifically, the computer device 1 may use a OPENCV function to calculate the Z-axis coordinate value Zcv of the marker 41 based on the color image.

At block S6, the computer device 1 determines whether the reference depth value Zrms of the marker 41 and the Z-axis coordinate value Zcv of the marker 41 are both less than the maximum depth value Zmax.

When the reference depth value Zrms of the marker 41 and the Z-axis coordinate value Zcv of the marker 41 are both less than the maximum depth value Zmax, the process goes to block S7.

When any one of the reference depth value Zrms of the marker 41 and the Z-axis coordinate value Zcv of the marker 41 is greater than or equal to the maximum depth value Zmax, the process goes to block S61. After block S61 is executed, block S1 is re-executed, and the computer device 1 re-calculates the maximum depth value Zmax based on the force of the gripper 23 in the direction of Z-axis read by the force sensor 24 of the robotic arm 2.

At block S61, the computer device 1 can directly recalibrate the camera 25 or can issue a prompt to prompt a user to recalibrate the camera 25.

Specifically, the recalibration of the camera 25 includes calibrating shooting parameters of the camera 25, such as a focal length of the camera 25.

At block S7, when the reference depth value Zrms of the marker 41 and the Z-axis coordinate value Zcv of the marker 41 are both less than the maximum depth value Zmax, the computer device 1 calculates a difference between the reference depth value Zrms of the marker 41 and the Z-axis coordinate value Zcv of the marker 41. When the difference is less than or equal to 0, the computer device 1 sets the reference depth value Zrms as the standard depth value of the marker 41; and when the difference is greater than 0, the computer device 1 sets the Z-axis coordinate value Zcv of the marker 41 as the standard depth value of the marker 41.

In other embodiments, the present disclosure may further include block S8.

At block S8, the computer device 1 can control the robotic arm 2 to grasp the target object 40 according to the standard depth value of the marker 41, when the marker 41 is provided on the target object 40 which is located on the internal jig 31.

According to the above description, the method for determining the standard value of the depth of the marker in the embodiment of the present disclosure can determine the depth value of the marker quickly and accurately under a premise of not changing existing jigs and environment, and the robotic arm can find the gripper position of the target object according to the determined standard depth value of the marker.

Figure 4:
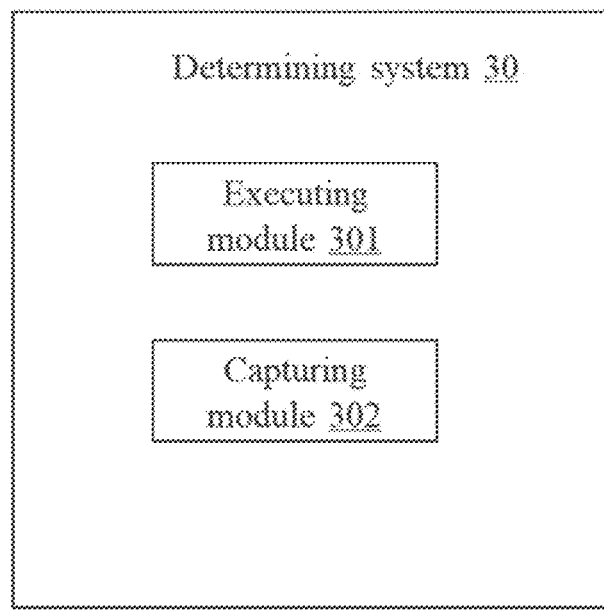
FIG. 4 is a block diagram of a determining system provided by a preferred embodiment of the present disclosure.

FIG. 4 shows a determining system provided by a preferred embodiment of the present disclosure.

In some embodiments, the determining system 30 runs in a computer device 1. The determining system 30 may include a plurality of modules. The plurality of modules can comprise computerized instructions in a form of one or more computer-readable programs that can be stored in a non-transitory computer-readable medium (e.g., a storage device 51 of the computer device 1 in FIG. 5), and executed by at least one processor (e.g., a processor 52 in FIG. 5) of the computer device 1 to implement the function described in detail in FIG. 2).

In at least one embodiment, the determining system 30 may include a plurality of modules. The plurality of modules may include, but is not limited to, an executing module 301 and a capturing module 302. The modules 301-302 can comprise computerized instructions in the form of one or more computer-readable programs that can be stored in the non-transitory computer-readable medium (e.g., the storage device 51 of the computer device 1), and executed by the at least one processor (e.g., a processor 52 in FIG. 5) of the computer device to implement a function of determining a standard depth value of a marker (e.g., described in detail in FIG. 2).

In order to explain the present invention clearly and simply, the functions of each module of the determining system 30 will be specifically described below from the aspect of constructing a three-dimensional map.

The executing module 301 calculates a maximum depth value Zmax based on a force of the gripper 23 in a direction of the Z-axis that is read by the force sensor 24 of the robotic arm 2. The executing module 301 establishes a coordinate system O-XYZ by setting a horizontal plane where the carrying platform 4 carrying the robotic arm 2 is located as an XOY plane of the coordinate system O-XYZ, and setting a direction perpendicular to the XOY plane as a Z axis of the coordinate system O-XYZ.

Specifically, referring to FIG. 2, in this embodiment, the executing module 301 sets a bottom end of the base 21 of the robotic arm 2 as the origin O, and sets the horizontal plane where the bottom end of the base 21 is located as the XOY plane, and sets an upward direction vertical to the XOY plane as the Z-axis.

In one embodiment, the calculating the maximum depth value Zmax based on the force of the gripper 23 in the direction of the Z-axis read by the force sensor 24 of the robotic arm 2 includes (a1)-(a6):

(a1) Setting the gripper 23 of the robotic arm 2 at a preset distance from the carrying platform 4.

In this embodiment, the preset distance may be 30 cm or 35 cm. The preset distance can be set according to actual application scenarios.

(a2) Controlling the robotic arm 2 to drive the gripper 23 to move down at a constant speed, and reading the force of the gripper 23 in the Z-axis direction using the force sensor 24 of the robotic arm 2.

Specifically, the executing module 301 can control the robotic arm 2 to drive the gripper 23 to move vertically downward at the constant speed.

(a3) Determining whether a change of the force in the gripper 23 in the Z-axis direction is greater than a preset value (for example, 1 Newton, 1.5 Newton, or other values) according to the force of the gripper 23 in the Z-axis direction read by the force sensor 24. When the change in the force of the gripper 23 in the Z-axis direction is greater than the preset value, the process goes to block (a4). When the force change of the gripper 23 in the Z-axis direction is less than or equal to the preset value, the block (a3) is re-performed.

In one embodiment, the change in the force of the gripper 23 in the Z-axis direction may refer to a difference between a first force value and a second force value. The first force value refers to the force of the gripper 23 in the Z-axis direction when the robotic arm 2 drives the gripper 23 to move down at the constant speed. The second force value refers to the force of the gripper 23 in the Z-axis direction when the robotic arm 2 does not drive the gripper 23 to move down at a constant speed. In other words, the second force value refers to the force value read by the force sensor 24 before the robotic arm 2 drives the gripper 23 to move down.

(a4) When the change in the force of the gripper 23 in the Z-axis direction is greater than the preset value, obtaining a Z-axis coordinate value of the robotic arm 2 and count a total number of Z-axis coordinate values of the robotic arm 2 that have been obtained. In other words, the total number of Z-axis coordinate values of the robotic arm 2 is increased by 1, when the change in the force of the gripper 23 in the Z-axis direction is greater than the preset value.

(a5) Determining whether the total number of Z-axis coordinate values of the robotic arm 2 that have been obtained equals N. If the total number of Z-axis coordinate values of the robotic arm 2 that have been obtained equals N, the process goes to block (a6). If the total number of Z-axis coordinate values of the robotic arm 2 that have been obtained is less than N, the process goes to block (a1).

In this embodiment, N may be equal to 30, or other value, such as 40 or 50.

(a6) When the total number of Z axis coordinate values of the robotic arm 2 that have been obtained equals N, calculating the maximum depth value based on the N number of Z-axis coordinate values of the robotic arm 2 that have been obtained according to the RMS (Root Mean Square).

The RMS is also called as the quadratic mean, which is an expression of a generalized mean of a power of 2 and can also be called as the mean of the second power. Specifically, the maximum depth value Zmax is calculated using the following formula:

$$Zmax = \sqrt{\frac{\sum_{i=1}^{n} x_i^2}{n}}$$

Wherein, n represents the total number of Z-axis coordinate values of the robotic arm 2 that have been obtained (that is, n=N, for example, n=30), represents the Z-axis coordinate value of the robotic arm 2.

The capturing module 302 controls the camera 25 of the robotic arm 2 to capture the marker 41 on the carrying platform 4 and obtains a depth image and a color image containing the marker 41 on the carrying platform 4.

As shown in FIG. 2, the four sides of the marker 41 on the carrying platform 4 are parallel to the carrying platform 4.

It should be noted that the markers 41 mentioned in the following all refer to the markers 41 on the carrying platform 4, the markers 41 mentioned in the following do not refer to the markers 41 on the target object 40 on the internal jig 31.

The executing module 301 obtains depth values of four corners of the marker 41 from the depth image.

For example, referring to FIG. 2, the executing module 301 obtains depth values D11, D12, D13, and D14 of the four corners of the marker 41.

The executing module 301 calculates a reference depth value Zrms of the marker 41 based on the depth values of the four corners of the marker 41.

In this embodiment, the executing module 301 calculates the reference depth value Zrms of the marker 41 based on the depth values of the four corners of the marker 41 according to the root mean square.

Specifically, the formula for calculating the reference depth value Zrms is:

$$Zrms = \sqrt{\frac{\sum_{i=1}^{n} x_i^2}{n}}$$

Wherein, n represents a number of corners of the marker 41 (that is, n=4 in this embodiment), and represents the depth value of each corner of the marker 41.

The executing module 301 obtains a Z-axis coordinate value Zcv of the marker 41 based on the color image.

Specifically, the executing module 301 may use a OPENCV function to calculate the Z-axis coordinate value Zcv of the marker 41 based on the color image.

The executing module 301 determines whether the reference depth value Zrms of the marker 41 and the Z-axis coordinate value Zcv of the marker 41 are both less than the maximum depth value Zmax.

When the reference depth value Zrms of the marker 41 and the Z-axis coordinate value Zcv of the marker 41 are both less than the maximum depth value Zmax, the process goes to block S7.

When any one of the reference depth value Zrms of the marker 41 and the Z-axis coordinate value Zcv of the marker 41 is greater than or equal to the maximum depth value Zmax, the process goes to block S61. After block S61 is executed, block S1 is re-executed, and the executing module 301 re-calculates the maximum depth value Zmax based on the force of the gripper 23 in the Z axis direction read by the force sensor 24 of the robotic arm 2.

The executing module 301 can directly recalibrate the camera 25 or can issue a prompt to prompt a user to recalibrate the camera 25.

Specifically, the recalibration of the camera 25 includes calibrating shooting parameters of the camera 25, such as a focal length of the camera 25.

When the reference depth value Zrms of the marker 41 and the Z-axis coordinate value Zcv of the marker 41 are both less than the maximum depth value Zmax, the executing module 301 calculates a difference between the reference depth value Zrms of the marker 41 and the Z-axis coordinate value Zcv of the marker 41. When the difference is less than or equal to 0, the reference depth value Zrms is set as the standard depth value of the marker 41; and when the difference is greater than 0, the Z-axis coordinate value Zcv of the marker 41 is set as the standard depth value of the marker 41.

In other embodiments, the present disclosure may further include block S8.

the executing module 301 can control the robotic arm 2 to grasp the target object 40 according to the standard depth value of the marker 41, when the marker 41 is provided on the target object 40 which is located on the internal jig 31.

Figure 5:
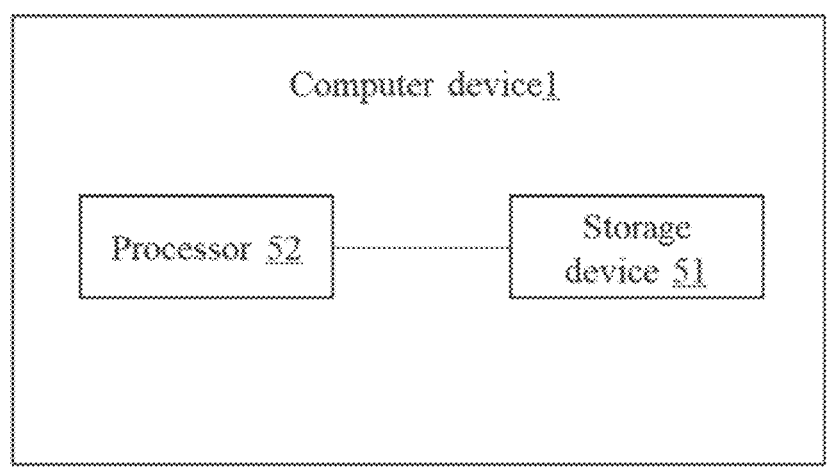
FIG. 5 is a schematic diagram of a computer device provided by a preferred embodiment of the present disclosure.

FIG. 5 shows a schematic block diagram of one embodiment of a computer device 1. In an embodiment, the computer device 1 may include, but is not limited to, a storage device 51, at least one processor 52. It should be understood by those skilled in the art that the structure of the computer device 1 shown in FIG. 5 does not constitute a limitation of the embodiment of the present disclosure. The computer device 1 may further include other hardware or software, or the computer device 1 may have different component arrangements. For example, the computer device 1 may also include communication equipment such as a WIFI device and a Bluetooth device.

In at least one embodiment, the computer device 1 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 1 is merely an example, and other existing or future electronic products may be included in the scope of the present disclosure, and are included in the reference.

In some embodiments, the storage device 51 can be used to store program codes of computer readable programs and various data, such as the determining system 30 installed in the computer device 1, and automatically access to the programs or data with high speed during the running of the computer device 1. The storage device 51 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 1 that can be used to carry or store data.

In some embodiments, the at least one processor 52 may be composed of an integrated circuit, for example, may be composed of a single packaged integrated circuit, or a plurality of integrated circuits of same function or different functions. The at least one processor 52 can include one or more central processing units (CPU), a microprocessor, a digital processing chip, a graphics processor, and various control chips. The at least one processor 52 is a control unit of the computer device 1, which connects various components of the computer device 1 using various interfaces and lines. By running or executing a computer program or modules stored in the storage device 51, and by invoking the data stored in the storage device 51, the at least one processor 52 can perform various functions of the computer device 1 and process data of the computer device 1. For example, the function of determining a standard depth value of a marker.

Although not shown, the computer device 1 may further include a power supply (such as a battery) for powering various components. Preferably, the power supply may be logically connected to the at least one processor 52 through a power management device, thereby, the power management device manages functions such as charging, discharging, and power management. The power supply may include one or more a DC or AC power source, a recharging device, a power failure detection circuit, a power converter or inverter, a power status indicator, and the like. In at least one embodiment, as shown in FIG. 4, the at least one processor 52 can execute various types of applications (such as the determining system 30) installed in the computer device 1, program codes, and the like. For example, the at least one processor 52 can execute the modules 301-302 of the determining system 30.

In at least one embodiment, the storage device 51 stores program codes. The at least one processor 52 can invoke the program codes stored in the storage device to perform functions. For example, the modules described in FIG. 4 are program codes stored in the storage device 51 and executed by the at least one processor 52, to implement the functions of the various modules for the purpose of realizing the determining a standard depth value of a marker as described in FIG. 3.

In at least one embodiment, the storage device 51 stores one or more instructions (i.e., at least one instruction) that are executed by the at least one processor 52 to achieve the purpose of determining a standard depth value of a marker as described in FIG. 3.

In at least one embodiment, the at least one processor 52 can execute the at least one instruction stored in the storage device 51 to perform the operations of as shown in FIG. 3.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for determining a standard depth value of a marker comprising:
   calculating a maximum depth value based on a force of a gripper of a robotic arm in a direction of a Z-axis read by a force sensor of the robotic arm, comprising: setting the gripper of the robotic arm at a preset distance from a carrying platform; obtaining a Z-axis coordinate value of the robotic arm when a change in the force of the gripper in the direction of Z-axis is greater than a preset value; counting a total number of Z-axis coordinate values of the robotic arm which have been obtained; calculating, when the total number of Z axis coordinate values of the robotic arm that have been obtained are equal to a predetermined threshold amount of values N, the maximum depth value based on the N number of Z-axis coordinate values of the robotic arm by a root mean square;
   controlling a camera of the robotic arm to capture a depth image and a color image of the marker;
   obtaining depth values of four corners of the marker from the depth image;
   calculating a reference depth value of the marker based on the depth values of the four corners of the marker;
   obtaining a Z-axis coordinate value of the marker based on the color image;
   calculating a difference between the reference depth value of the marker and the Z-axis coordinate value of the marker, when both of the reference depth value of the marker and the Z-axis coordinate value of the marker are less than the maximum depth value;
   setting the reference depth value as the standard depth value of the marker in response that the difference is less than or equal to 0; and
   setting the Z-axis coordinate value of the marker as the standard depth value of the marker in response that the difference is greater than 0.

2. The method as claimed in claim 1, further comprising:
   re-calculating the maximum depth value based on the force of the gripper in the direction of Z-axis read by the force sensor, in response that any one of the reference depth value of the marker and the Z-axis coordinate value of the marker is greater than or equal to the maximum depth value.

3. The method as claimed in claim 1, further comprising:
   controlling the robotic arm to drive the gripper to move down at a constant speed;
   reading the force of the gripper in the direction of Z-axis using the force sensor of the robotic arm; and
   controlling the camera of the robotic arm to capture the depth image and the color image of the marker when four sides of the marker on the carrying platform are parallel to the carrying platform.

4. The method as claimed in claim 1, further comprising:
   calculating the reference depth value of the marker based on the depth values of the four corners of the marker by a root mean square.

5. The method as claimed in claim 1, wherein the obtaining the Z-axis coordinate value of the marker based on the color image comprises:
   calculating the Z-axis coordinate value of the marker using an OPENCV function based on the color image.

6. The method as claimed in claim 1, further comprising:
controlling the robotic arm to grasp a target object according to the standard depth value of the marker, when the marker is provided on the target object which is located on an internal jig.

7. A computer device comprising:
a storage device;
at least one processor; and
the storage device storing one or more programs, which when executed by the at least one processor, cause the at least one processor to:
calculate a maximum depth value based on a force of a gripper of a robotic arm in a direction of a Z-axis read by a force sensor of the robotic arm, comprising: setting the gripper of the robotic arm at a preset distance from a carrying platform; obtaining a Z-axis coordinate value of the robotic arm when a change in the force of the gripper in the direction of Z-axis is greater than a preset value; counting a total number of Z-axis coordinate values of the robotic arm which have been obtained; calculating, when the total number of Z axis coordinate values of the robotic arm that have been obtained are equal to a predetermined threshold amount of values N, the maximum depth value based on the N number of Z-axis coordinate values of the robotic arm by a root mean square;
control a camera of the robotic arm to capture a depth image and a color image of the marker;
obtain depth values of four corners of the marker from the depth image;
calculate a reference depth value of the marker based on the depth values of the four corners of the marker;
obtain a Z-axis coordinate value of the marker based on the color image;
calculate a difference between the reference depth value of the marker and the Z-axis coordinate value of the marker, when both of the reference depth value of the marker and the Z-axis coordinate value of the marker are less than the maximum depth value;
set the reference depth value as the standard depth value of the marker in response that the difference is less than or equal to 0; and
set the Z-axis coordinate value of the marker as the standard depth value of the marker in response that the difference is greater than 0.

8. The computer device as claimed in claim 7, wherein the at least one processor is further caused to:
re-calculate the maximum depth value based on the force of the gripper in the direction of Z-axis read by the force sensor, in response that any one of the reference depth value of the marker and the Z-axis coordinate value of the marker is greater than or equal to the maximum depth value.

9. The computer device as claimed in claim 7,
wherein the at least one processor is further caused to:
control the robotic arm to drive the gripper to move down at a constant speed;
read the force of the gripper in the direction of Z-axis using the force sensor of the robotic arm;
control the camera of the robotic arm to capture the depth image and the color image of the marker when four sides of the marker on the carrying platform are parallel to the carrying platform.

10. The computer device as claimed in claim 7, wherein the at least one processor is further caused to:
calculate the reference depth value of the marker based on the depth values of the four corners of the marker by a root mean square.

11. The method as claimed in claim 7, wherein the obtaining the Z-axis coordinate value of the marker based on the color image comprises: calculating the Z-axis coordinate value of the marker using an OPENCV function based on the color image.

12. The method as claimed in claim 7, wherein the at least one processor is further caused to:
control the robotic arm to grasp a target object according to the standard depth value of the marker, when the marker is provided on the target object which is located on an internal jig.

13. A non-transitory storage medium having instructions stored thereon, when the instructions are executed by a processor of a computer device, the processor is configured to perform a method of determining a standard depth value of a marker, wherein the method comprises:
calculating a maximum depth value based on a force of a gripper of a robotic arm in a direction of a Z-axis read by a force sensor of the robotic arm, comprising: setting the gripper of the robotic arm at a preset distance from a carrying platform; obtaining a Z-axis coordinate value of the robotic arm when a change in the force of the gripper in the direction of Z-axis is greater than a preset value; counting a total number of Z-axis coordinate values of the robotic arm which have been obtained; calculating, when the total number of Z axis coordinate values of the robotic arm that have been obtained are equal to a predetermined threshold amount of values N, the maximum depth value based on the N number of Z-axis coordinate values of the robotic arm by a root mean square;
controlling a camera of the robotic arm to capture a depth image and a color image of the marker;
obtaining depth values of four corners of the marker from the depth image;
calculating a reference depth value of the marker based on the depth values of the four corners of the marker;
obtaining a Z-axis coordinate value of the marker based on the color image;
calculating a difference between the reference depth value of the marker and the Z-axis coordinate value of the marker, when both of the reference depth value of the marker and the Z-axis coordinate value of the marker are less than the maximum depth value;
setting the reference depth value as the standard depth value of the marker in response that the difference is less than or equal to 0; and
setting the Z-axis coordinate value of the marker as the standard depth value of the marker in response that the difference is greater than 0.

14. The non-transitory storage medium as claimed in claim 13, wherein the method further comprises:
re-calculating the maximum depth value based on the force of the gripper in the direction of Z-axis read by the force sensor, in response that any one of the reference depth value of the marker and the Z-axis coordinate value of the marker is greater than or equal to the maximum depth value.

15. The non-transitory storage medium as claimed in claim 13,
wherein the method further comprises:
controlling the robotic arm to drive the gripper to move down at a constant speed;
reading the force of the gripper in the direction of Z-axis using the force sensor of the robotic arm; and
controlling the camera of the robotic arm to capture the depth image and the color image of the marker when four sides of the marker on the carrying platform are parallel to the carrying platform.

16. The non-transitory storage medium as claimed in claim 15, wherein the method further comprises:
calculating the reference depth value of the marker based on the depth values of the four corners of the marker by a root mean square.

17. The non-transitory storage medium as claimed in claim 13, wherein the obtaining the Z-axis coordinate value of the marker based on the color image comprises: calculating the Z-axis coordinate value of the marker using an OPENCV function based on the color image.

18. The non-transitory storage medium as claimed in claim 13, wherein the method further comprises:
controlling the robotic arm to grasp a target object according to the standard depth value of the marker, when the marker is provided on the target object which is located on an internal jig.

* * * * *